Nov. 7, 1967   F. B. CUPP ET AL   3,351,895
DEPTH INDICATOR AND CONTROLLER
Filed April 21, 1965   3 Sheets-Sheet 1

INVENTORS
FREDERICK B. CUPP
BURTON L. FRANKEL
BY
ATTYS.

INVENTORS
FREDERICK B. CUPP
BURTON L. FRANKEL
BY
ATTYS.

Nov. 7, 1967    F. B. CUPP ET AL    3,351,895
DEPTH INDICATOR AND CONTROLLER
Filed April 21, 1965    3 Sheets-Sheet 3
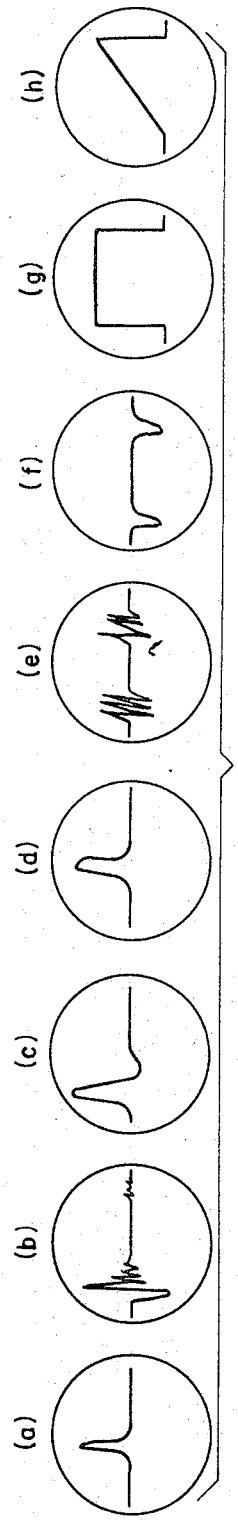
FIG. 5.
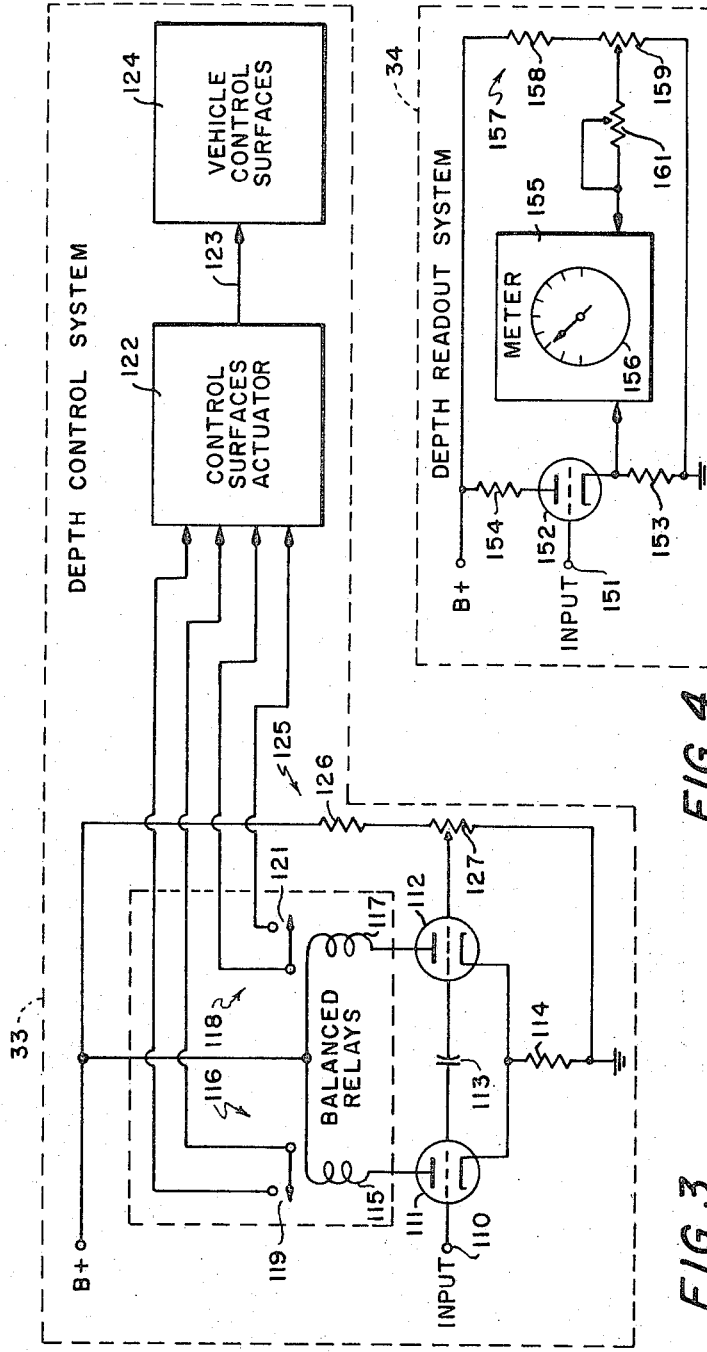
FIG. 4.
FIG. 3.
INVENTORS
FREDERICK B. CUPP
BURTON L. FRANKEL
ATTYS.

3,351,895
DEPTH INDICATOR AND CONTROLLER
Frederick B. Cupp, Willoughby, and Burton L. Frankel, Beachwood, Ohio, assignors to the United States of America as represented by the Secretary of the Navy
Filed Apr. 21, 1965, Ser. No. 450,575
15 Claims. (Cl. 340—3)

The present invention relates generally to distance measuring devices and in particular it is an improved method and means for determining and indicating the distance to a predetermined object and producing an error signal proportional to the deviation of said determined distance from a given control distance. In even greater particularity, the present invention consists of a sonar-type, echo-ranging depth sounder which transmits sonic pulses through sea water toward the ocean floor for reflection therefrom in such manner that a precise measurement of the time interval between said transmission and the reception of said reflection may be used to indicate the distance a vehicle is from said ocean floor at any given instant and to provide a means for accurately controlling the distance said vehicle is located from said ocean floor as it travels therealong.

Although other prior art devices have been employed for similar purposes, they appear to leave a great deal to be desired from the standpoints of accuracy and simplicity of circuitry. Accordingly, the instant invention is an advancement in the art, inasmuch as it provides improved accuracy with a simplified, compact structure.

It is, therefore, an object of this invention to provide an improved sonic depth finder.

Another object of this invention is to provide an improved method and means for determining and indicating the distance to a predetermined object.

Another object of this invention is to provide an improved method and means for controlling the distance a submarine vehicle travels above the sea floor.

Another object of this invention is to provide an improved method and means for indicating the distance a submarine vehicle travels above the sea floor.

Still another object of this invention is to provide an improved method and means for producing an error signal that is proportional to the deviation from a predetermined control parameter.

Another object of this invention is to provide a combination depth indicator-control system that is easily and economically manufactured, operated, and maintained.

Other objects and many of the attendant advantages will be readily appreciated as the subject invention becomes better understood by reference to the following detailed description when considered in conjunction with the accompanying figures of the drawing wherein like reference characters designate like parts and wherein:

FIG. 3 is a combination schematic and block diagram of the depth control system of FIGS. 1 and 2;

FIG. 4 is a schematic diagram of the depth readout system of FIGS. 1 and 2;

FIG. 5 illustrates a plurality of representative signal waveforms that occurs at various elements in the invention, respectively.

Figure 1:
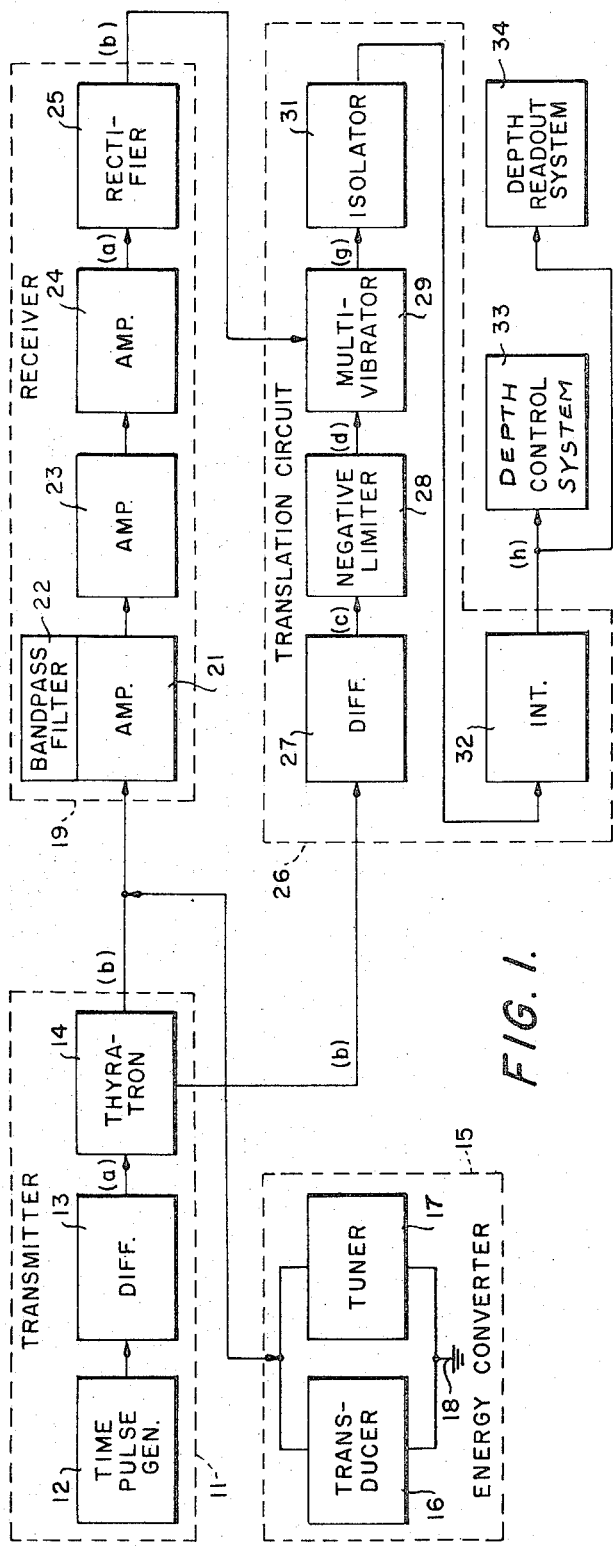
FIG. 1 is a block diagram of the subject invention.
Figure 2:
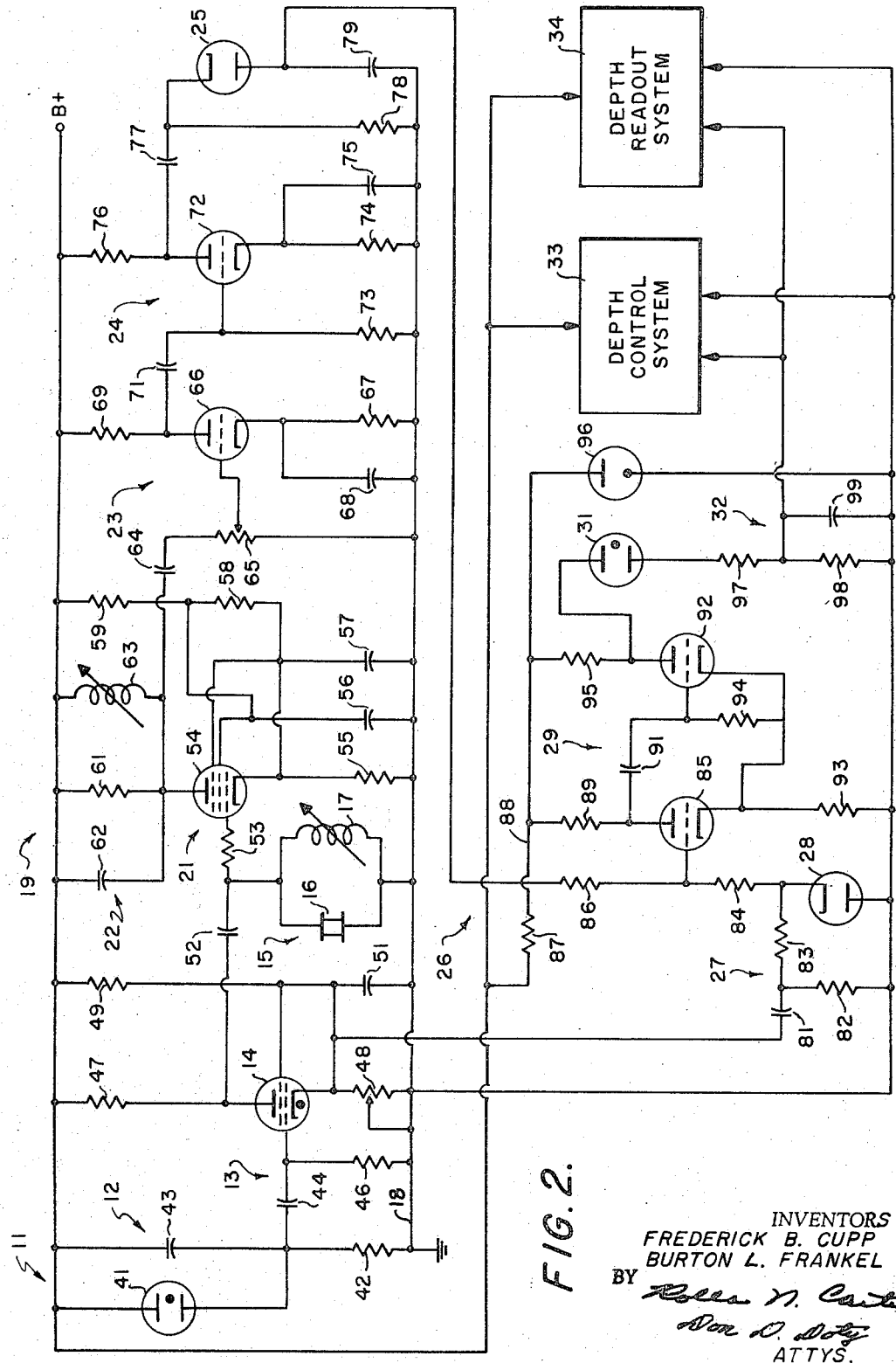
FIG. 2 is a combination detailed schematic and block diagram of the device of FIG. 1.

Referring now to FIGS. 1 and 2, there is shown a transmitter 11 having a time pulse generator 12 which may, for example, be a relaxation oscillator or the like that generates timing pulses which are appropriate for determining the repetition rate of transmitter 11. The output of time pulse generator 12 is coupled through a differentiator 13 to the input of a 5727 thyratron 14, the output of which constitutes the output of transmitter 11.

The output of the thyratron 14 is coupled to an energy converter 15 consisting of a transducer 16 and an inductive tuner 17 connected in parallel therewith. In actual practice said transducer 16 is connected between the output of the thyratron 14 and a ground 18.

Transducer 16 in this particular preferred embodiment is a reversible electroacoustical transducer because it is being used in a subaqueous medium as part of a unique sonar type system for submarine vehicle depth indication and control purposes. However, should the overall operations of the vehicles involved be appropriate to other environments, any suitable transducer which will properly operate in said environments may be substituted therefor. Hence, for instance, the transducer 16 in such case may be an electromagnetic transducer if said environment is in the nature of an atmospheric or space type.

The input and output of the transducer 16 are preferably one and the same and are connected to the input of a receiver 19, which in this instance is an amplifier 21. Of course, in this particular arrangement, the output of the thyratron 14 is likewise coupled to the input of the amplifier 21. On the other hand, in the event it is desirable as an optimizing means for any given operational circumstance, a pair of transducers—one for transmitting and one for receiving——may be substituted for the reversible transducer 16. In such case, the output of the thyratron 14 would be fed to the input of the transmitting transducer, and the output of the receiving transducer would be supplied to the input of the amplifier 21. So doing, of course, would be obvious to and well within the purview of one skilled in the art having the benefit of the teachings herein presented.

Optionally, a tank circuit type bandpass filter 22 is incorporated in the plate circuit of the amplifier 21 for the purpose of increasing receiver sensitivity at the resonance frequency of the transducer 16 and to reduce the spurious noise that may otherwise adversely affect the operation thereof. This, then, improves the signal-to-noise ratio of the signal received by the transducer 16, as it is processed in the receiver 19.

The output of the amplifier 21 is coupled through a second stage amplifier 23 and a third stage amplifier 24 to the input of a rectifier 25.

Another of the outputs of the thyratron 14 is coupled to the input of a translation circuit 26, which forms a predetermined type of signal that is proportional to the time period that occurs between the broadcast of the transmitter signal and the reflected reception thereof from a given target. In actual practice, said another output of the thyratron 14 is applied to the input of a differentiator 27, the output of which is passed through a negative limiter 28 before being applied to one of the inputs of a bistable multivibrator 29. The output of the multivibrator 29 is coupled through a circuit isolation and stage biasing NE-2 neon tube 31 to an integrator 32, the output of which constitutes the output of the aforementioned translation circuit. And the output of the integrator 32 is connected to any preferred utilization apparatus such as, for example, a depth control system 33 and/or a vehicle position, distance, or depth readout system 34. Of course, the systems 33 and 34 may be used for respectively controlling and indicating distance to any given target warranted by operational circumstances. However, since in the particular preferred embodiment the depth of sea water is involved, the aforesaid control and readout systems have been defined accordingly.

In both FIGS. 1 and 2, the aforementioned depth control system 33 and depth readout system 34 have been depicted in block diagram form, but a more detailed disclosure thereof has been illustrated in FIGS. 3 and 4, respectively, and will be discussed subsequently.

Referring now to FIG. 2, wherein a detailed schematic diagram in combination with a block diagram is illustrated in such manner as will disclose a specific predetermined preferred embodiment of the subject invention, there is shown a NE-2 neon tube 41 with one plate thereof connected to B+ and the other plate thereof coupled through a resistor 42 to ground 18. A capacitor 43 is connected in parallel with said neon tube 41. Of course, the aforegoing elements constitute the relaxation oscillator 12 mentioned previously in connection with FIG. 1. The output therefrom is taken from the junction of a resistor 42 and a capacitor 43 and is coupled through a coupling capacitor 44 to the control grid of a 5727 tube acting as the thyratron 14. A biasing resistor 46 interconnects the control grid of the thyratron 14 and ground. The plate of thyratron 14 is coupled through a resistor 47 to B+, and the cathode thereof is coupled through a variable resistor 48 to ground. The screen grid and the cathode of the thyratron 14 are coupled to the common junction of a series connected resistor 49 and capacitor 51, the series combination of which interconnects the aforesaid B+ and ground.

The output of the thyratron 14 is taken from the plate thereof and supplied through a coupling capacitor 52 to the input of the previously mentioned energy converter 15 which, of course, includes the parallel connected transducer 16 and inductive tuner 17. In this particular practice, as may readily be seen from FIG. 2, said energy converter 15 interconnects said capacitor 52 and ground.

The capacitor 52 is, likewise, connected through a resistor 53 to the input of the receiver 19 which, in this particular case, happens to be the control grid of a pentode amplifier tube 54. The cathode of the pentode 54 is coupled through a resistor 55 to ground, the screen grid of the pentode 54 is coupled through a capacitor 56 to ground and is also connected to the junction of two resistors 58 and 59, and the suppressor grid of pentode 54 is directly coupled to the cathode thereof and through a capacitor 57 to ground. Said suppressor grid of pentode 54 is also connected through the series connected resistors 58 and 59 to the aforesaid B+ voltage, and the plate thereof is coupled through a resistor 61 to said B+ voltage also. A capacitor 62 and a variable inductance 63 are connected in parallel with the aforesaid resistor 61 and with each other.

The output from the amplifier 21 is taken from the plate of the pentode 54 and is coupled through a capacitor 64 and the resistance portion of a potentiometer 65 to ground. The slider arm pick-off of the potentiometer 65 is coupled to the control grid of triode tube 66 located in the amplifier circuit 23. The cathode of the triode 66 is connected through a resistor 67 to ground. A capacitor 68 is connected in parallel with said resistor 67. The plate of the triode tube 66 is connected through a resistor 69 to the aforesaid B+ voltage.

The output of the amplifier 23 is taken from the plate of the triode tube 66 and is coupled through a coupling capacitor 71 to the grid of a triode tube 72 located in the previously mentioned amplifier circuit 24. A resistor 73 is connected between the grid of the triode 72 and ground, the cathode of the triode 72 is likewise connected to ground through a resistor 74. A capacitor 75 is connected in parallel with said resistor 74. The plate of the triode 72 is coupled through a resistor 76 to the aforesaid B+ voltage.

The output of the amplifier 24 is taken from the plate of the triode tube 72 and is supplied through a coupling capacitor 77 to the cathode of the aforesaid rectifier 25 and through a biasing resistor 78 to ground. The plate of diode rectifier 25 is coupled through a capacitor 79 to ground.

As may readily be seen from FIG. 2, the aforementioned thyratron circuit 14 has two outputs, one of which is the already disclosed plate output and the other of which is the now disclosed cathode output. This cathode output is coupled to a capacitor 81 in the previously mentioned differentiator circuit 27 consisting of said capacitor 81 and a resistor 82 connected thereto and ground. Another resistor 83 is connected between the output of said differentiator circuit 27, which, in this particular case, is in the common junction of said capacitor 81 and resistor 82, and the cathode of the previously mentioned negative limiter diode 28. The plate of said diode 28 is, of course, connected to ground in order for it to operate as a negative limiter.

The output of the negative limiter 28 is taken from the cathode thereof and coupled through a resistor 84 to the control grid of a triode 85 located in the previously mentioned bistable multivibrator circuit 29. A resistor 87 and a voltage regulator tube 86 connected in series across the aforementioned B+ voltage form a voltage regulating circuit which maintains at a fixed level a supply voltage 88 thereby stabilizing the operation of the multivibrator 29. Accordingly, the plate of the triode 85 is coupled through a resistor 89 to said supply voltage 88. The plate of the triode 85 is connected through a coupling capacitor 91 to the control grid of another triode 92 which is also a part of the aforesaid multivibrator circuit 29. The cathode of said triode 92 is directly connected to the cathode of said triode 85 and both are coupled through a resistor 93 to ground. A resistor 94 interconnects the control grid of triode 92 and the cathode of triode 92. The plate of triode 92 is coupled through a resistor 95 to the aforesaid supply voltage 88.

The output of the multivibrator circuit 29 is taken from the plate of the triode 92 and is coupled through a NE-2 neon tube 31 and a resistor 97 to the input of the previously mentioned integrator circuit 32. As may readily be seen, in this particular practice, said resistor 97 is connected to another resistor 98 which is also connected to ground. A capacitor 99 is connected in parallel with the resistor 98.

The output of the integrator circuit 32 is taken from the common junction of resistor 98 and capacitor 99 and is applied to the input tube of the previously mentioned depth control system 33 and/or depth readout system 34. Of course, inasmuch as said depth control system 33 and depth readout system 34 require appropriate power to be applied thereto in order to function as intended, they are also connected to both the aforesaid B+ voltage and ground.

Referring now to FIG. 3, the depth control system 33 is shown as having an input terminal 110 which is adapted for being connected to the output of integrator 32 shown in FIGS. 1 and 2 and is connected to the control grid of a triode tube 111. Another triode tube 112 has its control grid connected through a capacitor 113 to the control grid of tube 111. The cathodes of both triodes 111 and 112 are interconnected and connected through a resistor 114 to ground. The plate of triode 111 is coupled through the inductance coil 115 of a relay 116 to a B+ voltage, and likewise the plate of triode 112 is coupled through the inductance coil 117 of another relay 118 to said B+ voltage. Relays 116 and 118 are balanced relays, and the switch elements 119 and 121 thereof are respectively actuated by the flow of current through the coils 115 and 117. Said switch elements are appropriately and conventionally connected to a control surfaces actuator 122, which may, for instance, be a conventional servomechanism or reversible servo motor. The actuator or shaft 123 of actuator 124 is mechanically connected to the horizontal elevator-type control surfaces 124 in such manner that they are moved to guide a predetermined vehicle up or down as it travels along a control path.

A voltage divider network 125 comprising a series connected resistor 126 and the resistance portion of potentiometer 127 is coupled between B+ and ground. The slider arm of potentiometer 127 is connected to the control grid of triode tube 112.

Depth readout system 34, shown in FIG. 4, has an input terminal 151 which is, likewise, adapted for being connected to the output of integrator 32 shown in FIGS. 1 and 2. It is also connected to the control grid of a triode tube 152. The cathode of triode 152 is coupled through a resistor 153 to ground, and the plate thereof is connected through a resistor 154 to B+. Triode 152 acts as a circuit isolation cathode follower and, consequently, the cathode thereof is the output thereof and it is connected to one terminal of an ammeter type of indicating meter 155, which is appropriately calibrated in accordance to the parameter being measured and indicated. Hence, for instance, meter 155 may have a scale 156 calibrated in feet, in event water depth is being measured.

A voltage divider network 157, comprising a resistor 158 connected in series with the resistance element of a potentiometer 159, is connected between B+ and ground. A variable resistor 161 interconnects the other terminal of meter 155 and the slider arm of potentiometer 159. As is conventional in the instrument art, potentiometer 159 is, from a functional standpoint, a zero adjustment element for meter 155, and variable resistor 151 is a sensitivity or range adjustment therefor. Both, of course, are desirable for meter calibration purposes and make the subject invention considerably more versatile than it otherwise would be. Of course, scale 156 may be calibrated in feet deviation from a predetermined control depth or path, or it may be calibrated as an absolute value of depth in terms of feet or other distance units. In either case, the adjustment of potentiometer 159 must be such that meter 155 will read correctly for the condition existing during any given operational circumstances and the information wanted.

The operation of the subject invention will now be discussed briefly in conjunction with all figures.

Figure 6:
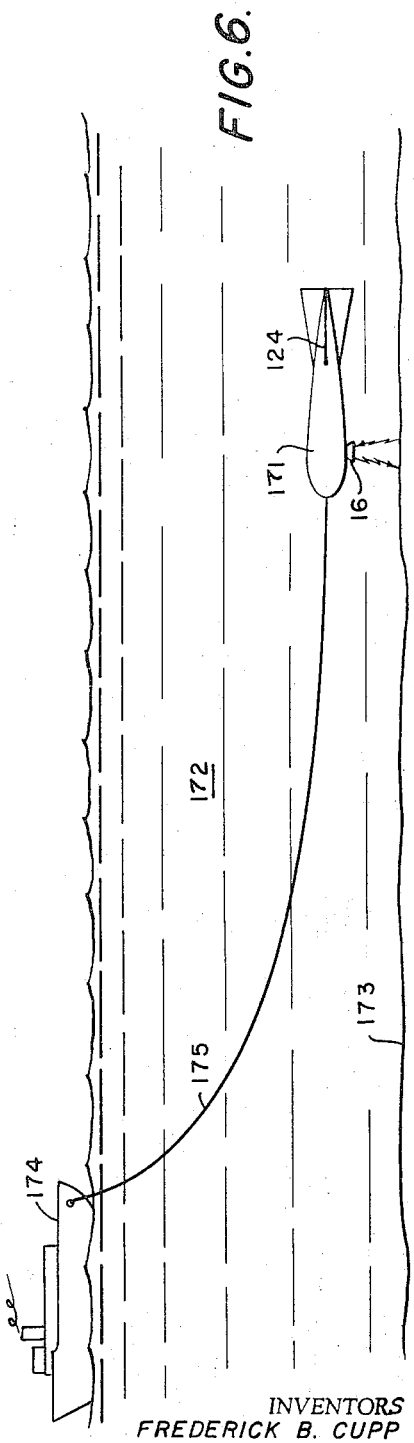
FIG. 6 is an elevational pictorial view of a typically representative system which may incorporate and use the subject invention to an advantage.

An exemplary use to which the subject invention may be put is pictorially illustrated in FIG. 6. If, for instance, it is desirable to tow a submarine vehicle 171 through sea water 172 or the like at a predetermined depth from the sea floor 173, this invention will facilitate so doing. In this particular case, a ship 174 is used as the tractor means and it tows vehicle 171 by means of a cable 175. Cable 175 may be of the type that provides electrical power and data signal telemetering, as well as having sufficient physical pulling strength characteristics. Accordingly, the electrical and electronic portion of the invention may be located either in ship 174 or submarine vehicle 171, depending on which ever is more expedient for any given operational circumstances and the results desired therefrom. Of course, it is preferable for the control surfaces actuator 122 to be located in vehicle 171, and, obviously, control surfaces 124 must be located on said vehicle in order for them to coact with the ambient sea water and provide attitude and direction control of the submarine vehicle.

Regardless of the physical disposition of the invention itself, it functions in the same manner and according to the same principles. Accordingly, as vehicle 171 is towed along the sea floor, an acoustical signal is broadcast thereto and reflected therefrom. The travel time of said acoustical signal, being proportional to the distance between vehicle 171 and sea floor 173, is then measured and used for depth control and/or depth indication purposes. These operations are specifically effected as follows:

The relaxation oscillator constituting time pulse generator 12 produces an oscillatory substantially sawtooth type of signal of predetermined frequency. This signal is differentiated by the differentiator 13 to produce positive spikes (see FIG. 5(a)) of sufficient voltage to trigger the thyratron 14 at a repetition rate identical to the output frequency of generator 12. When the thyratron 14 fires, the voltage at the plate drops rapidly to zero which forces the capacitor 52 to discharge through the coil 17, thereby causing the tank circuit 15 to oscillate for a short time if the transducer 16 is mechanically resonant at approximately 120 kc. per second. It is preferably tuned electrically by the slug-tuned choke constituting tuner 17 so that it is also electrically resonant at 120 kc. per second. Thus, the output pulse from thyratron 14 excites this resonant transducer-tuner energy converter circuit with a dampened oscillatory signal comparable to that exemplarily shown in FIG. 5(b), and transducer 16 broadcasts a proportional acoustical signal throughout its ambient subaqueous medium.

At the same instant, a positive pulse taken from the cathode of thyratron tube 14 is applied to differentiator 27 where it is differentiated into a signal having a waveform comparable to that shown in FIG. 5(c). Then, it is polarity clamped by positive clamp 28 to make it have a waveform substantially like that shown in FIG. 5(d), before being applied to the input of multivibrator 29.

Although the output pulse from the thyratron 14 is also supplied to and is processed by the receiver 19 and then applied to the input of the multivibrator 29 as a negative pulse, due to the time constant of differentiator 27 being large with respect to the period of said negative pulse, the aforesaid positive pulse lasts slightly longer and is by the nature of the ratio of the resistors 84 and 86 larger in amplitude at the grid of the tube 85 thereby causing the tube 85 to conduct. This, in turn, causes the tube 92 of the multivibrator 29 to cease conduction and the plate voltage thereof to increase in the positive direction and produce an output signal comparable to that shown in FIG. 5(g). This increases the potential difference across circuit isolator neon tube 31, causing it to conduct and commence charging capacitor 99 of integrator circuit 32.

The sea floor echoes of said broadcast acoustical signals are picked up by transducer 16, amplified by amplifiers 23, 24, and 25 to produce an electrical signal having a waveform that is substantially like that shown in FIG. 5(e). This signal is then rectified by diode rectifier 25 to delete the positive polarities therefrom and produce a signal having negative pips substantially comparable to those shown in the waveform of FIG. 5(f). Each negative pulse, of course, occurs at the time a sea floor echo signal is received and, hence, it is applied to the input of the multivibrator 29 at that time. Since the positive pulse generated during thyratron operation is no longer present to cancel said negative pulse, it will turn multivibrator 29 off and, thus, discontinue the charging of the integrator capacitor 99. When this occurs, the waveform of the voltage signal across capacitor 99 takes on the characteristic exemplarily represented by FIG. 5(h). The voltage to which capacitor 99 is charged is, of course, directly proportional to the positive period or length of the waveform of FIG. 5(g) and, therefore, is also proportional to the particular distance or depth being measured by the subject invention.

When the voltage of capacitor 99 is compared with a predetermined control voltage, the difference therebetween constitutes an error signal that is proportional to the deviation of said submarine vehicle from its predetermined control path. This signal, in turn, may then be used to indicate the distance being measured or the distance to the control path, or, in the alternative, it may be used as a corrective or compensating signal for guiding the submarine vehicle back to the predetermined control path depth. As a general rule, hunting thereabout will occur, but for all practical purposes the amount of control provided is quite satisfactory.

When the latter case is the desired effect, depth control system 33 is incorporated in the invention. This system is shown in more detail in FIG. 3. The input thereto is applied to terminal 110 from the output of integrator 32. Another direct current voltage is supplied by adjustable voltage divider network 125 which is preferably calibrated in feet altitude, thereby providing a depth or altitude reference potential which is applied to the control grid of triode 112. Balanced relays in the plate circuits of triodes 111 and 112 will conventionally operate respectively to cause control surfaces actuator 122 to move vehicle control surfaces 124 up or down, so as to correct for vehicle deviation from the control path. When the voltage applied to the grid of triode 111 is equal to the voltage applied to the grid of triode 112, no corrective action occurs because the vehicle is on the control depth path and, consequently, balanced relays 116 and 118 are not operated. But, in event the vehicle gets off the control path, one or the other of triodes 111 or 112 will fire and energize its respective relay to, in turn, actuate the proper conventional servo of control surfaces actuator 122, in order to move vehicle control surfaces up or down to guide the submarine vehicle back to its control depth.

In event only an indication of the vehicle depth is desired, the output integrator 32 is applied to distance readout system 34, depicted in detail in FIG. 4. Actually, the output of integrator 32 is applied to input terminal 151 which is coupled to the grid of triode 152. The presence of a positive voltage on said grid causes triode 152 to conduct and act as a circuit isolation cathode follower and thus supply a proportional positive voltage to meter 155. Meter 155, of course, effectively compares this voltage with the voltage effectively picked off of potentiometer 159 of voltage divider network 157 and produces a reading on scale 156 that is proportional to the difference therebetween. Zero and range calibration adjustments of meter 155 are achieved by the proper manual setting of potentiometer 159 and variable resistor 161, respectively. The scale 156 of meter 155 may be calibrated in any desired units; however, in this particular embodiment, it would probably be preferable to calibrate it in feet so that the depth, path deviation, or other indication will be in familiar units.

As illustrated in FIGS. 1 and 2, distance or depth control system 33 and depth readout system 34 may be incorporated in the subject invention for simultaneous use therein. However, it should be understood that either may be incorporated therein separately if so desired, in order to accomplish any predetermined operational purpose.

Obviously, many modifications of this embodiment or other embodiments of the subject invention will readily come to the mind of one skilled in the art having the benefit of the teachings presented herein in accompaniment with the associated drawing. Therefore, it is to be understood that the invention is not to be limited thereto and that said modifications and other embodiments are intended to be included within the scope of the appended claims.

What is claimed is:
1. Means for producing an error signal that is proportional to the distance a submarine vehicle deviates from a predetermined control path comprising in combination,
    means for broadcasting acoustical energy toward a predetermined target the location of which is known relative to the aforesaid predetermined control path,
    means for receiving the echo of said broadcast acoustical energy from said predetermined target,
    means connected to said broadcasting and receiving means for producing a substantially squarewave type of signal the positive portion of which has a period that is proportional to the distance to said target,
    a neon tube adapted for firing and extinguishing at predetermined voltages, respectively, coupled to the output of said substantially squarewave type of signal producing means,
    integrator means connected to the output of said neon tube for producing a first voltage that is proportional to the positive period thereof,
    adjustable means for providing a second voltage representing the known distance between said control path and said target,
    means connected to the outputs of said first and second voltage producing means for producing an error signal representing the difference between said first and second voltages,
    control surface means mounted on said submarine vehicle for controlling the attitude and travel direction thereof, and
    actuator means connected between said error signal producing means and said control surface means for providing up and down movement thereto in response to said error signal and as appropriate to substantially eliminate the distance deviation of the aforesaid submarine vehicle from its predetermined control path.

2. The invention according to claim 1 further characterized by a readout system coupled to the output of the aforesaid integrator means for indicating the distance said submarine vehicle is located from said predetermined target at any given instant.

3. The invention according to claim 1 further characterized by a readout system coupled to the output of the aforesaid integrator means for indicating the distance said submarine vehicle is located from said predetermined control path at any given instant.

4. Means for determining, controlling, and indicating the depth at which a submarine vehicle runs along the sea floor comprising in combination,
    a time pulse generator,
    a first differentiator coupled to the output of said time pulse generator,
    a thyratron having an input and a pair of outputs with the input thereof coupled to the output of said first differentiator,
    a reversible transducer having an input and an output with the input thereof connected to one of the outputs of said thyratron,
    a second differentiator connected to the other output of said thyratron,
    a positive clamp coupled to the output of said second differentiator,
    a bistable multivibrator having a pair of inputs and an output with one of the inputs thereof connected to the output of said positive clamp,
    amplifier means connected to the output of said reversible transducer,
    a rectifier interconnecting the output of said amplifier means and the other input of the aforesaid bistable multivibrator,
    a circuit isolator means connected to the output of said bistable multivibrator,
    an integrator coupled to the output of said circuit isolator means, and
    a depth control system connected to the output of said integrator.

5. The device of claim 4 wherein said reversible transducer is an electroacoustical transducer capable of projecting sonic energy throughout a predetermined subaqueous medium in proportional response to an electrical input signal and producing an electrical output signal in proportional response to sonic energy received from said subaqueous medium.

6. The device of claim 4 wherein said depth control system comprises,
    a first triode tube having a grid, a cathode, and a plate with the grid thereof connected to the output of said integrator,
    a second triode tube having a grid, a cathode, and a plate with the cathode thereof connected to the cathode of said first triode,
    a capacitor interconnecting the grids of said first and second triode tubes,
    a B+ voltage,
    a ground, a resistor connected between the interconnected cathodes of said first and second triode tubes and said ground, a pair of balanced relays, each of which has an inductance and a switch timely actuatable thereby, with the inductances thereof respectively connected between the plates of said first and second triode tubes and said B+ voltage, a potentiometer having a resistance and a slider arm slidably in contact therewith with the resistance thereof effectively connected between said B+ voltage and said ground and with the slider arm thereof connected to the grid of the aforesaid second triode tube, control surface actuator means connected to the switches of said pair of balanced relays in such manner that the output thereof is adapted for moving control surfaces up when one of said first and second triode tubes conducts and down when the other of said first and second triode tubes conducts, and vehicle control surfaces attached to said control surface actuator for up and down movement in response to the output thereof.

7. Means for determining, controlling, and indicating the depth at which a submarine vehicle runs along the sea floor comprising in combination, a time pulse generator, a first differentiator coupled to the output of said time pulse generator, a thyratron having an input and a pair of outputs with the input thereof coupled to the output of said first differentiator, a reversible transducer having an input and an output with the input thereof connected to one of the outputs of said thyratron, a second differentiator connected to the other output of said thyratron, a positive clamp coupled to the output of said second differentiator, a bistable multivibrator having a pair of inputs and an output with one of the inputs thereof connected to the output of said positive clamp, amplifier means connected to the output of said reversible transducer, a rectifier interconnecting the output of said amplifier means and the other input of the aforesaid multivibrator, a circuit isolator means connected to the output of said multivibrator, an integrator coupled to the output of said circuit isolator means, and a depth readout system connected to the output of said integrator.

8. The device of claim 7 wherein said reversible transducer is an electroacoustical transducer capable of projecting sonic energy throughout a predetermined subaqueous medium in proportional response to an electrical input signal and producing an electrical output signal in proportional response to sonic energy received from said subaqueous medium.

9. The device of claim 7 wherein said depth readout system comprises, a triode tube having a grid, a cathode, and a plate with the grid thereof connected to the output of said integrator, a B+ voltage, a first resistor coupled between the plate of said triode tube and said B+ voltage, a ground, a second resistor connected between the cathode of said trode tube and said ground, a potentiometer having a resistance and a slider arm slidably in contact therewith with the resistance thereof effectively connected between said B+ voltage and said ground, a variable resistor connected to the slider arm of said potentiometer, and an ammeter connected between said variable resistor and the cathode of the aforesaid triode tube.

10. The invention according to claim 9 further characterized by said ammeter having a scale calibrated in depth of water in feet.

11. Means for determining, controlling, and indicating the depth at which a submarine vehicle runs along the sea floor comprising in combination, a time pulse generator, a first differentiator coupled to the output of said time pulse generator, a thyratron having an input and a pair of outputs with the input thereof coupled to the output of said first differentiator, a reversible transducer having an input and an output with the input thereof connected to one of the outputs of said thyratron, a second differentiator connected to the other output of said thyratron, a positive clamp coupled to the output of said second differentiator, a bistable multivibrator having a pair of inputs and an output with one of the inputs thereof connected to the output of said positive clamp, amplifier means connected to the output of said reversible transducer, a rectifier interconnecting the output of said amplifier means and the other input of the aforesaid multivibrator, a circuit isolator means connected to the output of said multivibrator, an integrator coupled to the output of said circuit isolator means, a depth control system connected to the output of the aforesaid integrator, and a depth readout system connected to the output of said integrator.

12. The device of claim 11 wherein said time pulse generator is a relaxation oscillator including a neon tube.

13. The device of claim 11 wherein said positive clamp is a diode having a cathode and a plate with the cathode thereof connected to the output of said second differentiator and the plate thereof connected to a ground.

14. The device of claim 11 wherein said rectifier is a diode having a cathode and a plate with the cathode thereof connected to the output of said amplifier means and the plate thereof connected through a capacitor to a ground.

15. The device of claim 11 wherein said circuit isolator means comprises a neon tube.

References Cited

UNITED STATES PATENTS

| 2,101,076 | 12/1937 | Laboureur et al. | 340—3 X |
| 2,728,900 | 12/1955 | Ross | 340—3 |
| 2,965,894 | 12/1960 | Sweeney | 343—7 |
| 3,030,050 | 4/1962 | Hagemann | 244—3 |
| 3,123,797 | 3/1964 | Ehrman | 340—1 |
| 3,153,220 | 10/1964 | Hagemann | 340—3 |
| 3,210,760 | 10/1965 | Olson et al. | 343—7 |
| 3,214,729 | 10/1965 | Frielinghaus | 340—1 X |

RODNEY D. BENNETT, *Primary Examiner.*

CHESTER L. JUSTUS, *Examiner.*

RICHARD A. FARLEY, *Assistant Examiner.*